United States Patent [19]

Blackwell et al.

[11] Patent Number: 5,152,819
[45] Date of Patent: * Oct. 6, 1992

[54] METHOD OF MAKING FUSED SILICA

[75] Inventors: Jeffery L. Blackwell, Corning, N.Y.; Michael S. Dobbins, Wilmington, N.C.; Robert E. McLay; Carlton M. Truesdale, both of Corning, N.Y.

[73] Assignee: Corning Incorporated, Corning, N.Y.

[*] Notice: The portion of the term of this patent subsequent to Aug. 27, 2008 has been disclaimed.

[21] Appl. No.: 750,561

[22] Filed: Aug. 26, 1991

Related U.S. Application Data

[63] Continuation-in-part of Ser. No. 568,230, Aug. 16, 1990, Pat. No. 5,043,002.

[51] Int. Cl.⁵ .............................................. C03B 19/06
[52] U.S. Cl. ................................. 65/3.12; 65/18.1; 65/900; 65/901; 423/336; 423/337; 427/255.1
[58] Field of Search ..................... 427/248.1, 255.3; 423/336, 337; 65/18.1, 3.12, 900, 901

[56] References Cited

U.S. PATENT DOCUMENTS

| | | | |
|---|---|---|---|
| 3,767,432 | 10/1973 | Thomas | 65/901 |
| 3,775,075 | 11/1973 | Keck | 65/3.12 |
| 3,821,070 | 6/1974 | Mansmann | 65/901 |
| 5,043,002 | 8/1991 | Dobbins | 65/3.12 |

FOREIGN PATENT DOCUMENTS

| | | | |
|---|---|---|---|
| 3082769 | 4/1991 | Japan | 427/255.3 |
| 0814860 | 3/1981 | U.S.S.R. | 423/336 |
| 2049641 | 12/1980 | United Kingdom | 423/336 |
| 2071644 | 9/1981 | United Kingdom | 65/3.12 |

Primary Examiner—Robert L. Lindsay
Attorney, Agent, or Firm—C. S. Janes, Jr.

[57] ABSTRACT

This invention relates to the production of high purity fused silica glass through oxidation and/or flame hydrolysis of a halide-free, organosilicon-R compound in vapor form having the following properties:

(a) producing a gas stream of a halide-free silicon-containing compound in vapor form capable of being converted through thermal decomposition with oxidation or flame hydrolysis to $SiO_2$;

(b) passing said gas stream into the flame of a combustion burner to form amorphous particles of fused $SiO_2$;

(c) depositing said amorphous particles onto a support; and (d) either essentially simultaneously with said deposition or subsequently thereto consolidating said deposit of amorphous particles into a virtually nonporous body; the improvement comprising utilizing a halide-free, organosilicon-R compound in vapor form having the following properties:

(1) a Si—R bond dissociation energy that is no higher than the dissociation energy of the Si—O bond;
(2) a boiling point no higher than 350° C.; and
(3) which, upon pyrolysis and/or hydrolysis, will produce decomposition products beside $SiO_2$ which are deemed to be environmentally safe or the emissions are below acceptable governmental standards.

34 Claims, 2 Drawing Sheets

5,152,819

METHOD OF MAKING FUSED SILICA

This is a Continuation-In-Part application of application Ser. No. 07/568,230, filed Aug. 16, 1990, now U.S. Pat. No. 5,043,002.

RELATED APPLICATION

U.S. patent application Ser. No. 750,616, filed concurrently herewith by J. L. Blackwell et al. under the title METHOD OF MAKING TITANIA-DOPED FUSED SILICA, is directed to the production of high purity fused silica glass doped with titanium wherein fused silica glass is doped through the use of a halide-free, titanium-containing compound in vapor form capable of being converted through thermal decomposition with oxidation or flame hydrolysis to $TiO_2$ selected from the group consisting of titanium, isopropoxide, titanium ethoxide, titanium-2-ethylhexyloxide, titanium cyclopentyloxide, a titanium amide, and mixtures thereof.

BACKGROUND

Various processes are known in the art that involve the production of metal oxides from vaporous reactants. The most basic requirements of such processes necessitate a feedstock solution, a means of generating and transporting vapors of the feedstock solution (hereafter called vaporous reactants) and an oxidant to a reaction site, and a means of catalyzing oxidation and combustion coincidentally, producing finely divided, spherical aggregates, called soot. This soot may be collected in any number of ways, ranging from a collection chamber to a rotating mandrel, and simultaneously or subsequently heat treated to form a non-porous, transparent, high purity glass article. The means for executing these reactions is usually a specialized piece of equipment with a unique arrangement of nozzles and burners.

Much of the initial research that led to the development, and thus patent protection, of a plethora of such processes focused on the production of fused silica. Selection of the appropriate feedstock was found to be as important in the production of high purity fused silica as the equipment used in its production. Consequently, a material was identified that could generate the needed vapor pressure of 200–300 mm at temperatures below 100° C.; the high vapor pressure of silicon tetrachloride ($SiCl_4$) isolated it as a convenient vapor source for soot generation, thus launching the discovery and use of a series of similar chloride-based feedstocks. This factor, more than any other, is responsible for the presently accepted use of $SiCl_4$, $GeCl_4$, $POCl_3$, and $BCl_3$ as vapor sources, even though these materials have certain chemically undesirable properties.

Silicon, germanium, zirconium, and titanium are metals often used in chloride form as vaporous reactants for forming high purity metal oxide glasses. However, $SiCl_4$ has been the industry standard among metal-source vaporous reactants used over the years for the production of high purity silica glasses. As disclosed in U.S. Pat. No. 3,698,936, one of several reactions may be employed to produce high purity fused silica via oxidation of $SiCl_4$; namely:

(1) $SiCl_4 + O_2 \rightarrow SiO_2 + Cl_2$,
(2) $SiCl_4 + O_3 \rightarrow SiO_2 + Cl_2$, or
(3) $SiCl_4 + H_2O \rightarrow SiO_2 + HCl$, whereby burners or jet assemblies are utilized in feeding the reactant gases and vapors to a reaction space. There are inherent economic disadvantages to each of these reactions.

These reactions, which oxidize $SiCl_4$ through pyrolysis and hydrolysis, have the disadvantage of producing a very strong acid by-product. While the first two reactions occur theoretically, it is likely that an auxiliary fuel is needed to achieve pyrolytic temperature, thus leading to hydrolysis of the silicon tetrachloride and formation of hydrochloric acid (HCl). Such a by-product is not only a detriment to many deposition substrates and the reaction equipment, but also has to be treated before being released into the environment. Such abatement systems have proven to be very expensive due to down-time, loss, and maintenance of equipment caused by the corrosiveness of HCl.

The first reaction, which utilizes oxygen as it occurs naturally, requires elevated reaction temperatures which, generally, are difficult to maintain without using specialized equipment. The second reaction requires ozone, an unstable form of molecular oxygen that not only warrants special handling, but also must be manufactured on site due to a lack of commercial availability. Notwithstanding the handling and disposal of the HCl by-product necessitated by the hydrolysis and pyrolysis of $SiCl_4$, the third reaction, also hydrolysis of $SiCl_4$, tends to be the preferred commercial method of producing fused silica for economic reasons.

Though hydrolysis of $SiCl_4$ has been the preference of industry for producing high purity fused silica over the years, the enhanced global sensitivity to environmental protection has led to more strict government regulation of point source emissions, prompting a search for less environmentally pernicious feedstocks. In new point source emission regulations, HCl, the byproduct of hydrolyzing $SiCl_4$, as well as many particulate pollutants, has to be cleansed from exhaust gases prior to being released into the atmosphere. The economic consequences of meeting these regulations have made commercial production of fused silica by downstream removal of HCl and other metal oxides from chloride-based feedstocks less attractive to industry.

As an alternative, high purity fused quartz or silica may also be produced by thermal decomposition and oxidation of silane, a compound that requires taking safety measures in handling due to the violent reaction caused when air is introduced into a closed container of silane. Silane is commonly reacted with carbon dioxide, nitrous oxide, oxygen, or water to produce a high purity material that is useful in producing, among other things, semiconductor devices, while emitting a host of by-products such as carbon monoxide, hydrogen, and nitrogen. However, silane has proven to be much too expensive and reactive to be considered for commercial use except possibly for extremely high purity applications.

The novelty of the invention described herein lies in the replacement of $SiCl_4$ in vapor deposition processes with a chloride-free, silica-source compound, thus greatly reducing, if not eliminating, the production of HCl. The advantages of operating under a chloride-free system include: reduced pollution abatement requirements and reduced equipment losses and maintenance due to the corrosive nature of HCl.

The teachings of the instant invention are easily adapted to known methods of producing high purity fused silica by flame pyrolysis or hydrolysis, such as those disclosed in the early patents by Nordberg (U.S. Pat. No. 2,239,551) in 1941 and Hyde (U.S Pat. No. 2,272,342) in 1942. It is anticipated that this process alteration may be adapted to a variety of deposition/collection techniques as well. Therefore, it is an object of this invention to provide an improved method of making high purity fused silica by utilizing alternative silicon-source compounds, thus greatly reducing, if not eliminating, the need for elaborate pollution abatement equipment.

While it is recognized that the primary application of the instant invention relates to the production of fused silica, the technology applied herein is generally applicable in instances where a high purity metal oxide glass is desired.

It is a further object of this invention to provide an improved method of making high purity metal oxide glasses through the use of alternative metal oxide source compounds, thereby greatly reducing the need for expensive pollution abatement systems.

SUMMARY OF THE INVENTION

In like manner to the disclosure of U.S. Pat. No. 5,043,002 supra, the instant invention utilizes halide-free, silicon-containing compounds as a replacement for the halide-based source feedstocks that are often oxidized by flame hydrolysis or pyrolysis, to produce transparent, high-purity silica glass articles. The production of fused silica glass through the use of pyrolyzable and/or hydrolyzable halide-free, silicon-containing compounds as the feedstock components results in carbon dioxide and water as the by-products.

In U.S. Pat. No. 5,043,002 we described and claimed polymethylsiloxanes as halide-free, silicon-containing compounds for use as replacements for halide-based source feedstocks, with polymethylcyclosiloxanes being the preferred members of that group of compounds. Thus, octamethylcyclotetrasiloxane, decamethylcyclopentasiloxane, and hexamethylcyclotrisiloxane were disclosed as being especially suitable as halide-free feedstocks.

Further laboratory work has demonstrated that operable halide-free, silicon-containing feedstocks need not be limited to the polymethylsiloxanes. That is, we have found that organosilicon materials satisfying the following three criteria can be suitably utilized as substitutes for halide-containing compounds:

(1) an operable organosilicon-R compound (R is an element of the Periodic Table) will have a Si—R bond dissociation energy that is no higher than that of the Si—O bond;

(2) an operable organosilicon-R compound will exhibit a significant vapor pressure at temperatures below 250° C. and a boiling point no higher than 350° C.; and, in the interest of safety, (3) an operable organosilicon-R compound will, upon pyrolysis and/or hydrolysis, yield decomposition products besides $SiO_2$ which are deemed to be environmentally safe or the emissions are below acceptable governmental standards.

That fundamental discovery resulted from our finding of a large number of halide-free, silicon-source compounds exhibiting a variety of bonding arrangements to the silicon atom that have proven to be useful as substitutes for halide-based materials. Three groups of compounds which have been found to be especially useful are categorized below according to the bonding arrangement in the basic structure:

(1) organosilicon-oxygen compounds, having a basic Si—O—Si structure, in particular linear siloxanes wherein an oxygen atom and a single element or group of elements, such as a methyl group, is bonded to the silicon atom;

(2) organosilicon-nitrogen compounds, having a basic Si—N—Si structure, such as aminosilanes, linear silazanes, and cyclosilazanes, wherein a nitrogen atom and a single element or group of elements are bonded to the silicon atom; and (3) siloxasilazanes, having a basic Si—N—Si—O—Si structure, wherein a nitrogen atom and an oxygen atom are bonded to the silicon atom.

These compounds have a significant vapor pressure when heated above 150° C. The prior art discloses halide-containing silanes as sources for producing silica (e.g., Si—$R_mCl_{2-m}$, where R is an organic group). Our experiments indicate that the presence of a halide is not necessary; indeed, organosilicon-R compounds free from halides produce silica having very high purity. Also, it must be recognized that, although the three groups of organosilicon-R compounds cited above as preferred embodiments of our invention disclose specific bonding arrangements in relation to the Si atom, these compounds are actually but a subset of a larger group of organosilicon-R compounds. Stated in another way, to be operable as a suitable feedstock, the halide-free, organosilicon-R compound need only to satisfy the three criteria outlined above.

Octamethyltrisiloxane is illustrative of an operable linear siloxane. Tris (trimethylsilyl) ketenimine, nonamethyltrisilazane, and octamethylcyclotetrasilazane are illustrative of an operable aminosilane, a linear silazane, and a cyclosilazane, respectively, and hexamethylcyclotrisiloxazane is illustrative of an operable siloxasilazane. The representative compounds in each of these classes of compounds comprise the preferred embodiment of each respective class.

Methyltrimethoxysilane (MTMS) has also been shown to be operable as a feedstock for producing fused silica of high purity, but it is very expensive and is more difficult to control in the combustion flame. Hence, whereas MTMS can conceivably be used as a substitute for the halide-based, silicon-containing compounds, its properties militate against our use thereof.

It will be appreciated that, similarly to the current commercial processes for doping fused $SiO_2$ articles produced via the thermal decomposition with oxidation or hydrolysis of $SiCl_4$ with various metals in order to modify the chemical and/or physical properties thereof, the fused $SiO_2$ articles prepared in accordance with the present invention can likewise be doped with meals. For example, fused silica articles have been doped commercially with $Al_2O_3$, $B_2O_3$, $GeO_2$, $P_2O_5$, and $TiO_2$ utilizing halide-containing compounds of aluminum, boron, germanium, phosphorus, and titanium, respectively. Like dopants can be utilized in the present inventive process but would, of course, provide a source of halide emissions. Consequently, to eliminate point source emissions of halides, organometallic compounds of the dopant metals will be employed. For example, isopropyl titanate and titanium ethoxide can be used as sources of titanium and methyl borate can furnish the dopant source of boron.

Further examples of operable organometallic dopants are found in U.S. Pat. No. 4,501,602 (Miller et al.). That patent describes the production of glass-ceramic articles via a vapor phase oxidation process wherein β-diketonate complexes selected from Groups IA, IB, IIA, IIB, IIIA, IIIB, IVA, and IVB, and the rare earth series of the Periodic Table are vaporized, the vapor is transported to an oxidation site, such as a burner or a hot plasma zone which is adjacent to a deposition substrate or within a deposition tube, and oxidized in the vapor phase to form particulate metal oxide soot. β-diketonate complexes are also available of metals in Group VA of the Periodic Table, notably vanadium and tantalum. Accordingly, the use of β-diketonte complexes provides a vaporizable source for a wide variety of dopant metals. In summary, our invention comprehends doping of fused $SiO_2$ articles with $P_2O_5$ and/or at least one metal oxide selected from Groups IA, IB, IIA, IIB, IIIA, IIIB, IVA, IVB, VA, and the rare earth series of the Periodic Table.

PRIOR ART

A plethora of patents have issued that describe the production of high purity metal oxides, and particularly fused silica, from a chloride-based feedstock encompassed in or feeding into a specialized piece of equipment. Such equipment has featured a number of burner arrangements and feedstock delivery system, all based on the oxidation of a metal chloride through flame hydrolysis or pyrolysis. Illustrative of this fact is U.S. Pat. No. 4,491,604 (Lesk et al.) wherein trichlorosilane, dichlorosilane, and silicon tetrachloride are flame hydrolyzed to form soot, and U.S. Pat. No. 3,666,414 (Bayer) wherein silicon halides, such as silicon chloroform, are flame hydrolyzed. In similar processes, U.S. Pat. Nos. 3,486,913 (Zirngibl) and 2,269,059 (McLachlan) teach of oxidation of halides: volatilized inorganic halide components such as $TiCl_4$, $CrCl_3$, $CrO_2Cl_2$, $SiCl_4$, $AlCl_3$, $ZrCl_4$, $FeCl_2$, $FeCl_3$, $ZnCl_2$, or $SnCl_4$ oxidized with air, steam, or oxygen are employed in '913; while silicon halides, ethyl silicate, methyl borate, $TiCl_4$, $AlCl_3$, and $ZrCl_4$ are employed in '059. None of the compounds cited in these references coincides with the halide-free, silicon-containing compounds of the instant invention, however.

U.S. Pat. No. 3,416,890 (Best, et al.) discloses a process for preparing finely-divided metal or metalloid oxides by the decomposition of a metal or metalloid per halide in a flame produced by the combustion of an oxidizing gas and an auxiliary fuel, such as carbon disulfide, carbon selenide sulfide, or carbon thiophosgene, consisting of a hydrogen-free compound containing sulfur bonded directly to carbon. The stated reference does not utilize the halide-free, silicon-containing compounds employed in the instant invention.

U.S. Pat. No. 2,239,551 (Dalton) discloses a method of making glass by decomposing a gaseous mixture of glass forming compounds in a flame of combustible gas, said mixture being used in the formation of anhydrous oxides of silicon, aluminum, and boron. Decomposable compounds such as ethyl or methyl silicate, silicochloroform, and silicon tetrafluoride may be substituted for silicon tetrachloride; methyl borate or boron hydride may be substituted for boron fluoride, etc. The stated reference does not mention any of the halide-free, silicon-containing compounds deemed to be the essence of the instant invention.

U.S. Pat. No. 2,326,059 (Nordberg) details a technique for making silica-rich ultra-low expansion glass by vaporizing tetrachlorides of Si and Ti into the gas stream of an oxy-gas burner, depositing the resultant mixture to make a preform, vitrifying the preform at 1500° C. to make an opal glass, and firing the opal preform at a higher temperature to cause it to become transparent. Unlike the instant invention, the stated reference does not employ the use of halide-free, silicon-containing required in the present inventive process.

U.S. Pat. No. 2,272,342 (Hyde) details a method of producing glass articles containing vitreous silica by vaporizing a hydrolyzable compound of silicon such as silicon chloride, siliconchlorform, methyl silicater, ethyl silicate, silicon fluoride, or mixtures thereof, using a water bath. The silicon compound vapor is hydrolyzed by water vapor in the flame of a burner and the resulting amorphous oxide is collected and subsequently sintered until a transparent glass results. The stated reference does not mention the halide-free, silicon-containing compounds forming the basis of the instant invention.

U.S. Pat. No. 4,501,602 was referred to above as describing the production of particulate metal oxide soot through the vapor phase deposition of β-diketonate complexes of metals from Groups IA, IB, IIA, IIB, IIIA, IIIB, IVA, IVB, and the rare earth series of the Periodic Table. Not only is no mention made of the halide-free, silicon-containing compounds required in the instant invention, but also the sole reference to a silicon-containing compound is $SiCl_4$.

Also cited in the art are several patents wherein silane and modifications thereof have been used in producing high purity fused silica. For example:

Japanese Patent Application No. 90838-1985, entitled MANUFACTURING METHOD OF QUARTZ GLASS PREFORM FOR OPTICAL TRANSMISSION, (Okamoto et al.) discloses a method of doping quartz glass by utilizing an ester silane expressed by the general formula $R^1{}_nSi(OR^2)_{4-n}$ and one or more dopants defined by the formulas $Ge(OR^3)_3$, $B(OR^3)_3$, and $PH_3$, where $R^1$ is a hydrogen atom, methyl or ethyl group; $R^2$ is a methyl or ethyl group; $R^3$ is an univalent hydrocarbon group; and n is an integer ranging between 0 and 4. A plethora of organometallic compounds are disclosed including: methyltrimethoxysilnae, dimethyldimethoxys, trimethylmethoxysilane, tetramethoxysilane, methyltriethoxysilane, and tetraethoxysilane. None of those compounds is utilized in our inventive method.

U.S. Pat. No. 3,117,838 (Sterling) describes a method of producing very pure fused quartz or silica by the combined thermal decomposition and oxidation of silane wherein either carbon dioxide, nitrous oxide, or water vapor and silane are fed into a burner or torch jet and the flame allowed to impinge on a carbon substrate upon which silica is deposited. Unlike the instant invention, the stated reference does not employ the use of halide-free, silicon-containing compounds required in the present inventive method.

U.S. Pat. No. 4,810,673 ( Freeman) discloses a method of synthesizing high quality silicon oxides by chemical vapor deposition of a source gas mixture which includes a halogenated silane component and an oxygen source, namely dichlorosilane and nitrous oxide. Unlike the instant invention, the stated reference does not employ the use of halide-free, silicon-containing compounds as a silicon-source compound.

U.S. Pat. No. 4,242,487 (Hasegawa et al.) discloses a method of producing a heat resistant, semi-inorganic compound that is useful as a material for various heat resistant materials by reacting an organoborosiloxane compound with at least one of the group of aliphatic polyhydric alcohols, aromatic alcohols, phenols, and aromatic carboxylic acids at 250° C. to 450° C. in an inert atmosphere. The stated reference does not mention the halide-free, silicon-source compounds deemed to be the essence of the instant invention.

PREFERRED EMBODIMENTS

In the preferred embodiment of the invention disclosed and claimed in U.S. Pat. No. 5,043,002, octamethylcyclotetrasiloxane (OMCTS) was the halide-free siloxane compound used as the feedstock in the vapor deposition processes utilized in making high purity fused silica for optical waveguide applications. Fused silica produced by oxidation of octamethylcyclotetrasiloxane results in the production of carbon dioxide and water as by-products.

In the boule process oxygen is bubbled through a $SiCl_4$ feedstock that is maintained at a specified low temperature. The vaporous $SiCl_4$ is entrained in oxygen, which acts as a carrier gas, transporting the vaporous $SiCl_4$ to the reaction site. The reaction site is comprised of a number of burners that combust and oxidize the vaporous $SiCl_4$ at a temperature greater than 1700° C.

EXAMPLE 1

Figure 1:
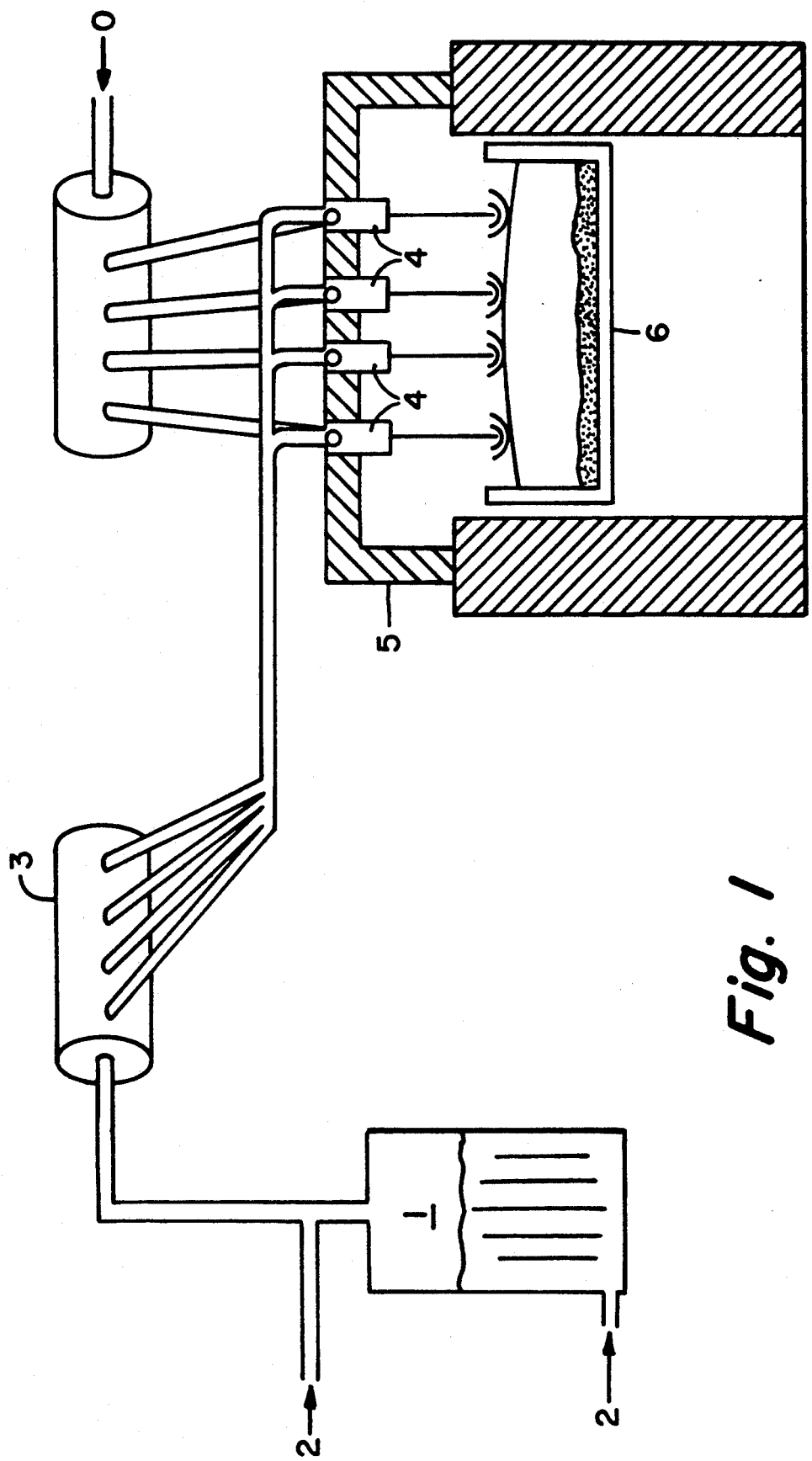
FIG. 1 comprises a schematic representation of the apparatus and process for forming large masses of fused silica.

The aforementioned system is illustrated in FIG. 1 wherein $SiCl_4$ was replaced with an OMCTS feedstock 1 in a commercial furnace to produce boules of high purity fused silica. An inert gas, nitrogen, was used as the carrier gas and a bypass stream of nitrogen 2 was introduced to prevent saturation of the vaporous stream. The vaporous reactant was passed through a distribution mechanism 3 before being transported to the reaction site wherein a number of burners 4 are contained in close proximity to a furnace crown 5. These burners combusted and oxidized the vaporous reactants at a temperature greater than 1700° C., directing high purity metal oxide soot and heat downward through the refractory furnace crown 5 where it is immediately deposited and consolidated to a nonporous mass on a hot bait 6.

In the production of relatively large boules, the maximum soot collection efficiencies measured using $SiCl_4$ as the feedstock have ranged about 60–70%. Extensive trials have indicated that the average deposition efficiency for boule process utilizing OMCTS as the source material is at least 10% higher than those processes using $SiCl_4$. Therefore, in addition to eliminating halide emissions, the quantity of particulate emissions is likewise reduced.

It is well recognized in the art that processing of the feedstock requires apparatus and transfer system capable of vaporizing the feedstock and delivering it in the vapor state. Somewhat higher temperatures are necessary due to its lower vapor pressure when compared to $SiCl_4$.

EXAMPLE 2

To broaden the general class of alternative non-polluting sources of silica, a number of organometallic compounds were investigated with several objectives in mind. First, we wanted to demonstrate that silica soot can, indeed, be made from the organosilicon compounds of the instant invention. Second, we wanted to determine whether the linear siloxanes would produce silica soot as has been demonstrated with the cyclosiloxanes (e.g. OMCTS). Third, we wanted to determine whether the Si—N bond of organosilicon-nitrogen compounds could be broken and replaced by a Si—O bond of higher bond strength during the combustion process. Finally, in accordance with the spirit of the instant invention, when decomposed to make high purity fused silica, the by-products of said organo-silicon compounds and the consequential emissions of said organosilicon compounds must be classified as environmentally safe by the OSHA (Occupational Health and Safety Administration) and the EPA (Environmental Protection Agency).

Experimental samples were either directly metered as liquid to a flash vaporizer, or as in one case, melted and bubbled over to the fume tube of a standard methane/oxygen ring burner. Octamethylcyclotetrasilazane, tris (trimethylsilyl) ketenimine, and octamethyltrisiloxane were obtained through commercial manufacturers and soot was produced from each. The soot was collected and chemically analyzed to determine the silicon, nitrogen, and oxygen content of each. The error of the wt. % $O_2$ is shown parenthetically to the last place indicated.

TABLE I

| Compound | % Nitrogen | % Oxygen | % Silicon |
| --- | --- | --- | --- |
| octamethyltrisiloxane | <0.01 | 53.7(4) | 46.6 |
| tris (trimethylsilyl) ketenimine | <0.01 | 53.4(4) | 46.6 |
| octamethylcyclotetrasilazane | <0.01 | 53.1(4) | 46.6 |

As can be seen from Table I, the linear siloxane octamethyltrisiloxane, an organosilicon-oxygen compound, the organosilicon-nitrogen compounds tris (trimethyl) ketenimine and octamethylcyclotetrasilazane pyrolyzed/-hydrolyzed to yield an amount of $SiO_2$ comparable to that produced with octamethylcyclotetrasiloxane, the most preferred polymethylcyclosiloxane described in Ser. No. 07/568,230.

The bond energy of the Si—O bond is 191.1±3.2 kcal/mole and that of the Si-N bond is 105±9 kcal/mole. Thus, the energy of the Si—N bond is about 86±10 kcal/mole less than that of the Si—O bond. The utility of tris (trimethyl) ketenimine in yielding $SiO_2$ confirms one of the above criteria which an operable organosilicon-R compound must obey; viz., that the dissociation energy of the Si—R bond must not exceed that of the Si—O bond. That factor, i.e., the presence of a Si—N bond, explains the effectiveness of siloxasilazanes in producing high purity $SiO_2$ when subjected to a pyrolysis/hydrolysis reaction with oxygen. The reaction products will essentially track those resulting from the pyrolysis/hydrolysis of an organosilicon-nitrogen compound.

A practical advantage which these materials have when compared to octamethylcyclotetrasiloxane is that the purity thereof is much higher. The specificallydescribed organosilicon compounds of the instant invention are generally free from the high levels of alkali metal and transition metal impurities found in OMCTS. OMCTS is reported to be 95% pure, while the cited organosilicon compounds of the instant invention have a reported 99% purity. The 5% level of impurities for OMCTS consists of higher molecular weight cyclosiloxanes not being totally separated by fractional distillation, and trace amounts of alkali and transition metals.

In waveguide processing, however, the requisite step of chlorine drying not only removes water, but also removes the alkali and transition metal impurities to a level <10 ppb, the level required when producing low attenuation fiber. Thus, the effect of these alkali and transition metal impurities is neutralized in the traditional processing sequence of optical waveguide fiber.

Most of the processes being developed by industry today for the manufacture of optical waveguides employ the chemical vapor deposition (CVD) concept or a modified version thereof. In a CVD experiment, each of the component liquids is heated to a constant temperature at which enough vapor pressure is generated to produce a reasonable rate of deposition. The individual vapors are entrained in a carrier gas stream, mixed together prior to combustion to ensure homogeneous output, and then passed through a burner flame, usually a natural gas/oxygen mixture, containing excess oxygen. The vapors in the mixture are converted to their respective oxides and exit the burner orifice to form a stream of the volatile gases and finely-divided, spherical particles of soot. The soot is collected on a mandrel (OVD) or bait tube [Axial Vapor Deposition (AVD)] and deposited in thin layers. The final product of soot collection, the porous preform, is then subjected to high temperature in which the preform consolidates to a nonporous monolithic glassy body.

In usual practice, the optical waveguide process is a three-step process. In the first stage of optical fiber fabrication, oxygen, the carrier gas, is bubbled through a liquid feedstock of $SiCl_4$ that is maintained at a constant temperature. The resulting vaporous reactant is transported to a reaction site, such as a burner, via a carrier gas, wherein the vaporous gas streams are combusted in a burner flame fueled with natural gas and oxygen. The presence of oxygen serves to convert the vaporous reactants to their respective oxides, exiting the burner orifice to form a stream of volatile gases and finely-divided, spherical particles of soot that are deposited onto a substrate, forming a porous blank or preform of opaque, white silica soot. Water, HCl, and carbon dioxide are emitted as byproducts of this reaction.

In the second stage the blank or preform is subsequently heat treated in a helium/chlorine atmosphere to full consolidation. In the third and final stage, conventional fiber-draw technology is utilized in extracting optical waveguide fiber from the preform.

Figure 2:
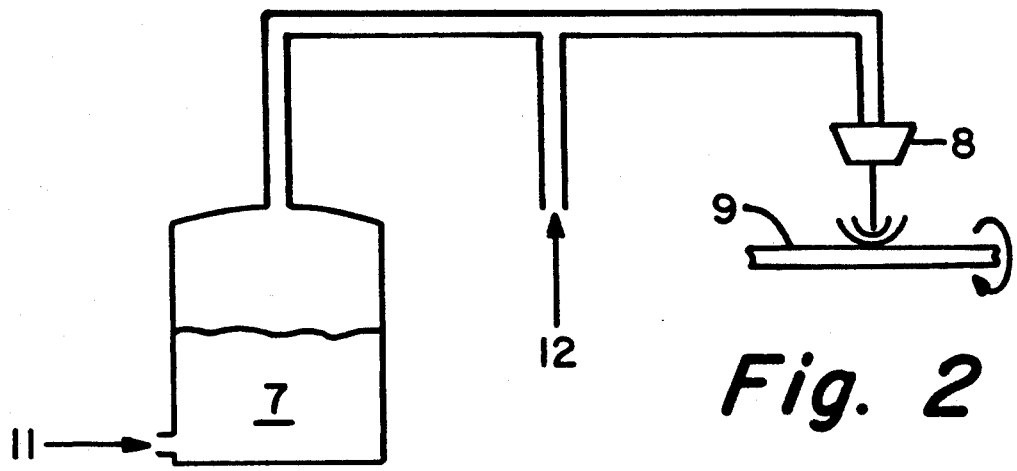
FIGS. 2 and 2A comprise schematic representations of the apparatus and process for depositing silica soot on a rotating mandrel to form a porous blank or preform.
Figure 2A:
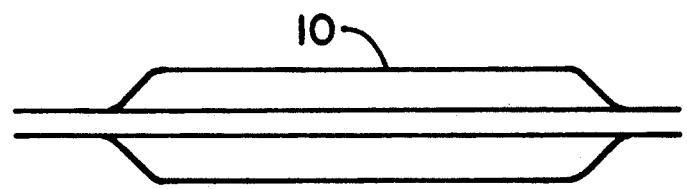
Figure 3:
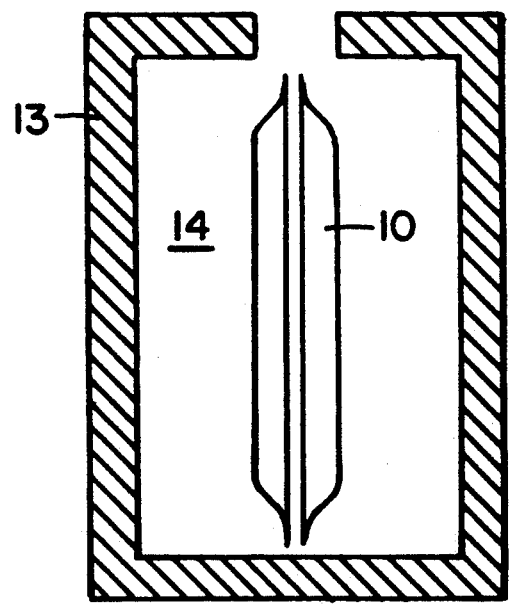
FIG. 3 comprises a schematic representation of a heating chamber wherein the porous blank is fired in an atmosphere of helium and chlorine to full consolidation to a non-porous body.

That process is illustrated in FIG. 2 and is equally applicable with the materials of the present invention. Hence, as is indicated in FIG. 2, $SiCl_4$ is replaced with one of the organosilicon-R compounds as feedstock 7 in the OVD process using standard OVD equipment and conventional OVD processing techniques used in making optical waveguides. An inert gas, nitrogen, is employed as the carrier gas and a methane/oxygen mixture is employed as the burner flame fuel, whereby combustion and oxidation are induced at the reaction site 8. The resulting soot is deposited on a rotating rod 9, thus forming a preform or blank 10 of silica soot. The preform is then heat treated in a consolidation furnace 11, in a $He/Cl_2$ atmosphere to full consolidation. Conventional fiber draw techniques are then employed in making optical waveguide fiber. No additional equipment is required, but the delivery system has to be capable of vaporizing the material and delivering it to a standard OVD burner in the vapor state.

While the principles of the instant invention have been described above in connection with specific embodiments and particular modifications thereof, it is to be clearly understood that this description is made only by way of example, and not as a limitation on the scope of the invention. Said principles may be otherwise embodied within the scope of the following claims.

We claim:

1. In a method for making a virtually non-porous body of high purity fused silica glass which comprises the steps of:
    (a) producing a gas stream of a halide-free, silicon-containing compound in vapor form capable of being converted through thermal decomposition with oxidation or flame hydrolysis to $SiO_2$;
    (b) passing said gas stream into the flame of a combustion burner to form amorphous particles of high purity fused silica;
    (c) depositing said amorphous particles onto a support; and
    (d) either essentially simultaneously with said deposition or subsequently thereto consolidating said deposit of amorphous particles into a virtually non-porous body of high purity fused silica; the improvement comprising utilizing as the halide-free, silicon-containing compound an organosilicon-R compound in vapor form selected from the group consisting of organosilicon-nitrogen compounds having a basic Si—N—Si structure, siloxasilazanes having a basic Si—N—Si—O—Si structure, and mixtures thereof having the following properties;
    (1) a Si—R bond dissociation energy that is no higher than the dissociation energy of the Si—O bond;
    (2) a boiling point no higher than 350° C., and
    (3) which, upon pyrolysis and/or hydrolysis, will produce decomposition products beside $SiO_2$ which are non-toxic.

2. A method according to claim 1 wherein said organosilicon-nitrogen compound is selected from the group consisting of an aminosilane, a linear silazane, and a cyclosilazane.

3. A method according to claim 2 wherein said aminosilane is tris ketenimine, said linear silazane is nonamethyltrisilazane and said cyclosilazane is octamethylcyclotetrasilazane.

4. A method according to claim 1 wherein said siloxasilazane is hexamethylcyclotrisiloxazane.

5. A method according to claim 1 wherein said gas stream is comprised of an inert gas.

6. A method according to claim 5 wherein said inert gas is nitrogen.

7. In a method for making a virtually non-porous body of high purity, fused silica glass doped with at least one dopant oxide comprising the steps of:
    (a) producing a gas stream containing a halide-free silicon-containing compound in vapor form capable of being converted through thermal decomposition with oxidation or flame hydrolysis to $SiO_2$ and a compound in vapor form capable of being converted through oxidation or flame hydrolysis to at least one member of the group consisting of P$_2$O$_5$ and a metal oxide which has a metallic component selected from the Groups IA, IB, IIA, IIB, IIIA, IIIB, IVA, IVB, VA, and the rare earth series of the Periodic Table;

(b) passing said gas stream into the flame of a combustion burner to form amorphous particles of high purity fused SiO$_2$ doped with an oxide dopant;

(c) depositing said amorphous particles onto a support; and (d) either essentially simultaneously with said deposition or subsequently thereto consolidating said deposit of amorphous particles into a virtually non-porous body of high purity fused silica; the improvement comprising utilizing as the halide-free, silicon-containing compound an organosilicon-R compound in vapor form selected from the group consisting of organosilicon-nitrogen compounds having a Si—N—Si structure, siloxasilazanes having a basic Si—N—Si—O—Si structure, and mixtures thereof having the following properties;

(1) a Si—R bond dissociation energy that is no higher than the dissociation energy of the Si—O bond;

(2) a boiling point no higher than 350° C., and (3) which, upon pyrolysis and/or hydrolysis, will produce decomposition products beside SiO$_2$ which are non-toxic.

8. A method according to claim 7 wherein said organosilicon-nitrogen compound is selected from the group consisting of an aminosilane, a silazane, and a cyclosilazane.

9. A method according to claim 8 wherein said aminosilane is tris ketenimine, said linear silazane is nonamethyltrisilazane and said cyclosilazane is octamethylcyclotetrasilazane.

10. A method according to claim 7 wherein said siloxasilazane is hexamethylcyclotrisiloxazane.

11. A method according to claim 7 wherein said gas stream is comprised of an inert gas.

12. A method according to claim 7 wherein said compound in vapor form capable of being converted to at least one member of the group consisting of P$_2$O$_5$ and a metal oxide which has a metallic component selected from the Groups IA, IB, IIA, IIB, IIIA, IIIB, IVA, IVB, VA, and the rare earth series of the Periodic Table is a halide-containing compound.

13. A method according to claim 12 wherein said inert gas is nitrogen.

14. A method according to claim 7 wherein said compound in vapor form capable of being converted to at least one member of the group consisting of P$_2$O$_5$ and a metal oxide which has a metallic component selected from the Groups IA, IB, IIA, IIB, IIIA, IIIB, IVA, IVB, VA, and the rare earth series of the Periodic Table is a halide-containing compound.

15. In a method for making optical waveguide fibers of high purity fused silica glass through the outside vapor deposition process comprising the steps of:

(a) producing a gas stream containing a halide-free silicon-containing compound in vapor form capable of being converted through thermal decomposition with oxidation or flame hydrolysis to SiO$_2$;

(b) passing said gas stream into the flame of a combustion burner to form amorphous particles of high purity fused SiO$_2$;

(c) depositing said amorphous particles onto a mandrel;

(d) consolidating said deposit of amorphous particles into a non-porous, transparent glass body of high purity fused silica; and (e) drawing optical waveguide fiber from said body; the improvement comprising utilizing as the halide-free silicon-containing compound an organosilicon-R compound in vapor form selected from the group consisting of organosilicon-nitrogen compounds having a basic Si—N—Si structure, siloxasilazanes having a basic Si—N—Si—O—Si structure, and mixtures thereof having the following properties;

(1) a Si—R bond dissociation energy that is no higher than the dissociation energy of the Si—O bond;

(2) a boiling point no higher than 350° C.; and (3) which, upon pyrolysis and/or hydrolysis, will produce decomposition products beside SiO$_2$ which are non-toxic.

16. A method according to claim 15 wherein said organosilicon-nitrogen compound is selected from the group consisting of an aminosilane, a silazane, and a cyclosilazane.

17. A method according to claim 16 wherein said aminosilane is tris ketenimine, said linear silazane is nonamethyltrisilazane and said cyclosilazane is octamethylcyclotetrasilazane.

18. A method according to claim 15 wherein said siloxasilazane is hexamethylcyclotrisiloxazane.

19. A method according to claim 15 wherein said gas stream is comprised of an inert gas.

20. A method according to claim 19 wherein said inert gas is nitrogen.

21. In a method for making waveguide fibers of high purity fused silica glass doped with an oxide dopant through the outside vapor deposition process comprising the steps of:

(a) producing a gas stream containing a halide-free silicon-containing compound in vapor form capable of being converted through thermal decomposition with oxidation or flame hydrolysis to SiO$_2$ and a compound in vapor form capable of being converted through thermal decomposition with oxidation or flame hydrolysis to at least one member of the group consisting of P$_2$O$_5$ and a metal oxide which has a metallic component selected from the Groups IA, IB, IIA, IIB, IIIA, IIIB, IVA, IVB, VA, and the rare earth series of the Periodic Table;

(b) passing said gas stream into the flame of a combustion burner to form amorphous particles of high purity fused SiO$_2$ doped with an oxide dopant;

(c) depositing said amorphous particles onto a mandrel;

(d) consolidating said deposit of amorphous particles into a non-porous, transparent glass body; and (e) drawing optical waveguide fiber from said body; the improvement comprising utilizing as the halide-free, silicon-containing compound an organosilicon-R compound in vapor form selected from the group consisting of organosilicon-nitrogen compounds having a basic Si—N—Si structure, siloxasilazanes having a basic Si—N—Si—O—Si structure, and mixtures thereof having the following properties;

(1) a Si—R bond dissociation energy that is no higher than the dissociation energy of the Si—O bond;

(2) a boiling point no higher than 350° C.; and (3) which, upon pyrolysis and/or hydrolysis, will produce decomposition products beside $SiO_2$ which are non-toxic.

22. A method according to claim 21 wherein said organosilicon-nitrogen compound is selected from the group consisting of an aminosilane, a linear silazane, and a cyclosilazane.

23. A method according to claim 22 wherein said aminosilane is tris ketenimine, said linear silazane is nonamethyltrisilazane and said cyclosilazane is octamethylcyclotetrasilazane.

24. A method according to claim 21 wherein said siloxasilazane is hexamethylcyclotrisiloxazane.

25. A method according to claim 21 wherein said gas stream is comprised of an inert gas.

26. A method according to claim 25 wherein said inert gas is nitrogen.

27. A method according to claim 21 wherein said compound in vapor form capable of being converted to at least one member of the group consisting of $P_2O_5$ and a metal oxide which has a metallic component selected from the Groups IA, IB, IIA, IIB, IIIA, IIIB, IVA, IVB, VA, and the rare earth series of the Periodic Table is a halide-containing compound.

28. A method according to claim 21 wherein said compound in vapor form capable of being converted to at least one member of the group consisting of $P_2O_5$ and a metal oxide which has a metallic component selected from the Groups IA, IB, IIA, IIB, IIIA, IIIB, IVA, IVB, VA, and the rare earth series of the Periodic Table is a halide-containing compound.

29. In a method for making optical waveguide fibers of high purity fused silica glass through the axial vapor deposition process comprising the steps of:
   (a) producing a gas stream containing a halide-free silicon-containing compound in vapor form capable of being converted through thermal decomposition with oxidation or flame hydrolysis to $SiO_2$;
   (b) passing said gas stream into the flame of a combustion burner to form amorphous particles of high purity fused $SiO_2$;
   (c) depositing said amorphous particles onto a bait tube;
   (d) consolidating said deposit of amorphous particles into a non-porous, transparent glass body of high purity fused silica; and
   (e) drawing optical waveguide fiber from said body; the improvement comprising utilizing as the halide-free, silicon-containing compound an organosilicon-oxygen compound in vapor form selected from the group consisting of organosilicon-nitrogen compounds having a basic Si—N—Si structure, siloxasilazanes having a basic Si—N—Si—O—Si structure, and mixtures thereof having the following properties;
   (1) a Si—R bond dissociation energy that is no higher than the dissociation energy of the Si—O bond;
   (2) a boiling point no higher than 350° C.; and
   (3) which, upon pyrolysis and/or hydrolysis, will produce decomposition products beside $SiO_2$ which are non-toxic.

30. A method according to claim 29 wherein said organosilicon-nitrogen compound is selected from the group consisting of an aminosilane, a silazane, and a cyclosilazane.

31. A method according to claim 30 wherein said aminosilane is tris ketenimine, said linear silazane is nonamethyltrisilazane and said cyclosilazane is octamethylcyclotetrasilazane.

32. A method according to claim 29 wherein said siloxasilazane is hexamethylcyclotrisiloxazane.

33. A method according to claim 29 wherein said gas stream is comprised of an inert gas.

34. A method according to claim 33 wherein said inert gas is nitrogen.

* * * * *

UNITED STATES PATENT AND TRADEMARK OFFICE
CERTIFICATE OF CORRECTION

PATENT NO.  : 5,152,819                      Page 1 of 2

DATED  : Oct. 6, 1992

INVENTOR(S) : Jeffery L. Blackwell, Michael S. Dobbins, Robert E. McLay, and Carlton M. Truesdale It is certified that error appears in the above-identified patent and that said Letters Patent is hereby corrected as shown below:

Column 6, line 7, "siliconchlorform" should read --silicochloroform--.

Column 6, line 7, "silicater" should read --silicate--.

Column 6, line 39, "methyltrimethoxysilnae" should read --methyltrimethoxysilane--.

Column 6, line 39, "dimethyldimethoxys" should read --dimethyldimethoxysilane--.

Column 11:
Claim 12 and Claim 13 should be reversed around and therefore new Claim 12 should read --according to claim 7--.

Claim 14, line 7, "halide-containing" should read --halide-free--.

Column 13:
Claim 22, line 3, "a linear silazane" should read --a silazane--.

Claim 28, line 7, "halide-containing" should read --halide-free--.

Column 14:
Claim 32, line 2, "hexamethylcyclotrisiloxazane" should read --hexamethylcyclotrisiloxane--.

UNITED STATES PATENT AND TRADEMARK OFFICE
CERTIFICATE OF CORRECTION

PATENT NO. : 5,152,819
DATED : October 6, 1992
INVENTOR(S) : Jeffery L. Blackwell, et al.

It is certified that error appears in the above-indentified patent and that said Letters Patent is hereby corrected as shown below:

Column 14, claim 34, line 2, remove the word "insert".

Signed and Sealed this

Nineteenth Day of October, 1993

Attest:

BRUCE LEHMAN

Attesting Officer     Commissioner of Patents and Trademarks